United States Patent
Washburn et al.

(10) Patent No.: US 6,921,114 B1
(45) Date of Patent: Jul. 26, 2005

(54) COUPLER FOR CONDUITS

(75) Inventors: Robert B. Washburn, Amherst, OH (US); Charles R. Herron, Strongsville, OH (US)

(73) Assignee: Arnco Corporation, Elyria, OH (US)

( * ) Notice: Subject to any disclaimer, the term of this patent is extended or adjusted under 35 U.S.C. 154(b) by 0 days.

(21) Appl. No.: 10/325,183

(22) Filed: Dec. 20, 2002

(51) Int. Cl.⁷ .............................................. F16L 39/00
(52) U.S. Cl. ..................... 285/321; 285/305; 285/369
(58) Field of Search ............................... 285/403, 369, 285/321, 305, 330

(56) References Cited

U.S. PATENT DOCUMENTS

| | | | |
|---|---|---|---|
| 2,831,711 A | * | 4/1958 | Leadbetter ................. 285/403 |
| 3,181,897 A | * | 5/1965 | Krayenbuhl et al. ........ 285/305 |
| 3,389,923 A | * | 6/1968 | Love, Jr. et al. ............ 285/321 |
| 3,606,402 A | | 9/1971 | Medney ...................... 285/305 |
| 3,759,553 A | | 9/1973 | Carter ........................ 285/260 |
| 3,759,554 A | | 9/1973 | Carter ........................ 285/260 |
| 4,186,946 A | | 2/1980 | Snow ......................... 285/94 |
| 4,269,436 A | | 5/1981 | Medney ...................... 285/47 |
| 4,281,860 A | | 8/1981 | Streit ..................... 285/137 R |
| 4,293,148 A | * | 10/1981 | Milberger ................. 285/305 |
| 4,593,944 A | * | 6/1986 | Milberger ................. 285/321 |
| 4,679,825 A | | 7/1987 | Taylor ....................... 285/93 |
| 4,697,947 A | | 10/1987 | Bauer et al. ................ 403/14 |
| 5,083,820 A | | 1/1992 | Hopperdietzel ............. 285/305 |
| 5,255,945 A | | 10/1993 | Toon ......................... 285/305 |
| 5,388,926 A | | 2/1995 | Stottlemyer ................ 403/294 |
| 5,511,826 A | | 4/1996 | Clare et al. .................. 285/5 |
| 5,813,705 A | | 9/1998 | Dole .......................... 285/321 |
| 5,868,443 A | | 2/1999 | Ungerman et al. ......... 285/369 |
| 5,951,064 A | | 9/1999 | Cotter ....................... 285/305 |
| 6,086,297 A | | 7/2000 | Lotfi ......................... 409/184 |
| 6,179,347 B1 | | 1/2001 | Dole et al. ................. 285/321 |
| 6,325,424 B1 | | 12/2001 | Metcalfe et al. ........... 285/305 |
| 6,352,288 B1 | | 3/2002 | Calkins ..................... 285/305 |

* cited by examiner

Primary Examiner—David Bochna
(74) Attorney, Agent, or Firm—Pearne & Gordon LLP

(57) ABSTRACT

A coupling assembly including a coupler body having a generally cylindrical shape and an opening at one end. The coupler body has an inner wall with an inner circumference and an outer wall. An abutment extends from the inner wall of the coupler body. The coupling assembly further includes a conduit having a generally cylindrical shape complementary to the coupler body. A coupler key groove extends along the inner circumference of an inner wall of the coupler body and is shaped like part of a parallelogram. The conduit has a conduit key groove and is generally shaped like part of a parallelogram. When the coupler key groove and the conduit key groove are aligned they form a pathway shaped like a parallelogram with two acute angles. An aperture in the wall of the coupler provides access to the pathway for a locking strip or flexible key. The locking key has a cross-section, which is a complementary shaped parallelogram. A sealing groove is also provided along the inner wall of the coupler to hold an O-ring.

22 Claims, 1 Drawing Sheet

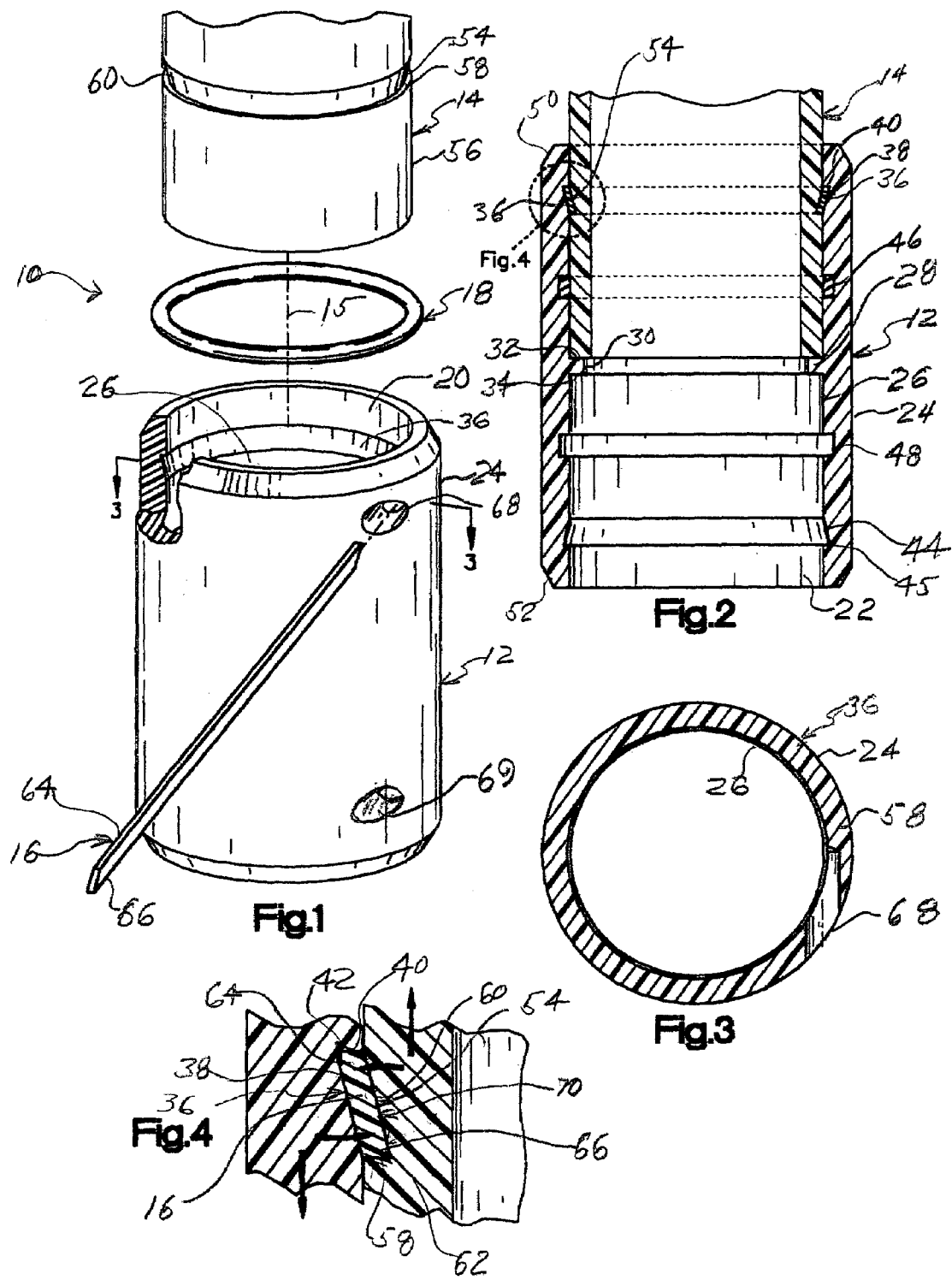

COUPLER FOR CONDUITS

BACKGROUND OF THE INVENTION

For many years cable has been laid underground. In recent times, many thousands of miles of optical cable have been laid to both replace electrical cable and as a new installation. While there are many ways to lay cable, it is often pushed or pulled through conduits. In view of the information explosion and the demand of the marketplace, it has been desirable and efficient to lay conduit in longer and longer lengths. Often, conduit is pulled and/or pushed through larger conduits or ducts for hundreds or thousands of feet at a time. Because of these lengths, tensile and other possible forces may build up to over 2000 lbs in the conduit while it is being pulled into place. In fact, it has been estimated that tensile forces acting on nominal 4 inch diameter duct may exceed 6000 lbs. while it is being pulled into larger conduits such as bored holes.

In order to withstand the tensile forces acting on the conduit, the conduit itself has to be strong. Moreover, because the conduit is often not long enough to be laid as a single piece it frequently has to be coupled to another length. Thus, the strength of the coupler and the connection have become a critical factors. Couplers for conduit are well known. For example, U.S. Pat. No. 6,179,347 B1, which is hereby included by reference, uses a type of coupler that is well known in the art. This coupler has a body which is cylindrical in shape and has an opening at both ends. On the circumference of the inner wall there is a rectangular groove. A conduit, which is designed to enter the coupler, has a complementary groove. When the grooves are aligned with each other they form a passageway for a flexible locking key. In the '347 B1 patent the locking key takes several forms. One of them is a series of complex and difficult to make V shaped elements that spring open. Another is a complex rhomboidal cross-section which would be critical to place in the right orientation.

Other embodiments of couplers are shown in U.S. Pat. No. 6,325,424 B1 and U.S. Pat. No. 6,352,288 B1, both of which are incorporated by reference. In addition to their complexity, they share a common problem with the other prior art couplers. None of them work well with high density polyethylene (HDPE) conduits. Most prior art couplers were designed to work with various materials, one of the most common being polyvinylchloride (PVC). However, HDPE is one of the more popular materials for conduit for economic, reliability and durability reasons. The traditional drawback of HDPE is that it is relatively soft. That is, it has a material modulus of elasticity typically less than 180,000 psi, whereas PVC has a modulus of elasticity of well over 350,000 psi.

When prior art couplers were connected to conduits made of the relatively soft HDPE, the conduits would bend or deform at the high tensile strengths endured during installation, use or removal. The result would be that the locking key would roll or move out of the grooves of the conduit or coupler and the connection would separate. Since the coupler was often far underground when the failure occurred, this was a major problem. The conduit had to be retrieved, another coupler put on the conduit and replaced or pulled back underground.

This invention provides a coupler that securely connects conduits made of HDPE, PVC and other commercially available materials so that they do not pull apart during the installation process, use and any subsequent removal. The coupler of this invention is particularly useful in connecting the ends of HDPE conduits and will successfully resist larger tensile forces. Other benefits of this coupler is a substantial savings in time and money in the laying of conduit since coupler failures will be minimized.

SUMMARY OF THE INVENTION

A coupling assembly including a coupler body having a generally cylindrical shape and an opening at one end. The coupler body has an inner wall and an outer wall and an abutment that extends from one of the walls of the coupler or on a conduit to limit the extent to which it may overlap with the conduit. The coupling assembly further includes the conduit having a generally cylindrical shape complementary to the coupler body and has dimensions and shape so that it fits snugly with the coupler body. A coupler key groove extends along the circumference of one of the walls of the coupler body spaced from the opening. A portion of the coupler key groove forms the sides of an acute angle. A conduit key groove extends along the circumference of one of the walls of the conduit and has a shape that is complementary to the coupler key groove. A portion of the coupler key groove forms an acute angle. When the coupler body and the conduit are aligned, the coupler key groove and the conduit key groove form a pathway. A locking key having acute angles complementary to acute angles of the grooves fit into the pathway and lock the coupler body and the conduit together.

BRIEF DESCRIPTION OF THE DRAWINGS

FIG. 1 is a perspective view of the unassembled coupling assembly including a coupler body, a conduit, and O-ring and a locking key.

FIG. 2 is a cross-sectional elevation of the coupling assembly as assembled.

FIG. 3 is a cross-sectional view along 3—3 of FIG. 1 and shows the coupler key groove.

FIG. 4 is an enlarged view of part of FIG. 2 and illustrates the cross-sectional shape of the locking key, coupler key groove and conduit key groove.

DETAILED DESCRIPTION OF THE DRAWINGS

FIG. 1 illustrates an unassembled coupling assembly 10 which includes a coupler body 12, conduit 14, a locking key 16, and O-ring 18, all having a central axis 15. As shown in FIG. 1 and in FIG. 2, the coupler body 12 is generally cylindrical in shape, has an opening 20 at one end thereof, and a second opening 22 at a second end. If only one opening were present, the article could be used as an end cap. The coupler body 12 is generally circular in cross-section but not necessarily so. The coupler body 12 further includes an outer wall 24 and an inner wall 26. Along the inner wall 26 of the coupler body 12 is an abutment 28 along the circumference of the inner wall 26. Alternately or in addition to, an abutment may be on the conduit. The abutment 28 may be a continuous ring around the circumference of the inner wall 26 or it may be a series of disconnected projections or any other similar type of arrangement that accomplishes the same purpose. The purpose of the abutment 28 is to limit the movement of the conduit 14 into the coupling. Any configuration that meets that purpose is considered within the scope of this invention. The abutment 28 illustrated, generally includes an inner wall 30 and sides 32 and 34.

A coupler key groove 36, as shown in FIGS. 1, 2, 3 and 4, extends along the circumference of the inner wall 26 and is shown as having an axial side 38 and a radial side 40. The coupler key groove 36 includes an acute angle 42 generally facing axially and radially along the coupler body 12. In one embodiment, the acute angle 42 may vary, as a practical matter, from about 60 degrees to about 85 degrees, but could theoretically be from 1 degree to 89 degrees. For the purpose of this invention, all acute angles that are operable are included. In particular, an angle of 80 degrees of the coupler key groove has been found to work successfully. If the acute angle 42 has its radial side 40 sloping upwardly from a central axis radially outwardly, i.e. if the radial side 40 is less than 90 degrees with the side of the coupler body, it helps to reduce the tendency of the coupler to slip over the locking key 16 during the application of tensile forces.

A second coupler key groove 44 in the area of the second opening 22 is substantially the same shape as the first coupler key groove but it faces in the opposite direction for the obvious reason that a tensile force would act on the groove 44 from the opposite direction. The second coupler key groove 44 is designed to accept a second conduit, not shown, for insertion into the second end 22 of the coupler body 12. The second coupler key groove 44 also has an acute angle 45 and a side that angles downwardly from the central axis radially outwardly. That is, one side of the acute angle 45 also forms an acute angle with a side fo the coupler body 12.

A sealing groove 46 is located along the inner circumference of the coupler body 12 along its inner wall 26. The sealing groove is generally rectangular in shape but may be any shape acceptable for receiving an O-ring 18 which seals the space between the coupler 12 and the casing 14.

A second sealing groove 48 is located between second coupler key groove 44 and the abutment 28. The second sealing groove is generally rectangular in shape and passes along the circumference of the inner wall 26. A second O-ring, not shown, would sit in second sealing groove 48 and seal the second end 22. The ends 50 and 52 of the coupler body 12 are tapered in order to facilitate its movement into other conduits or bore hole.

The conduit 14 may be either a tube or pipe and is generally cylindrical in shape and complementary to the coupler body 12 so that it may fit snugly therein. Most frequently, the conduit 14 has a circular cross-section but it may be other shapes. It is also anticipated that the conduit 14 may be so sized and adapted so that it fits outside of the coupler body 12. In this case, the grooves would be on the opposite walls of those illustrated. A conduit key groove 54 is located along the outer circumference of the outer wall 56. In practice, all grooves would normally extend entirely around the circumference, but this is not necessarily a restriction. The key grooves could only extend partially around the circumference and/or be discontinuous and still be functional. Conduit key groove 54 includes a radial side 58 and an axial side 60, as best seen in FIG. 4. The terms "radial" and "axial" are used in the general sense of an approximate direction and not in the specific sense of requiring exactly those directions. An acute angle 62, as best noted in FIG. 4, is formed by the sides 58 and 60. The acute angle 62 faces generally outwardly and upwardly. Its side 58 may angle upwardly and outwardly from a central axis 15. This orientation of the side 58 discourages the conduit from slipping over the locking key 16 when the coupling assembly is put under heavy tensile loads.

The locking key 16, as best seen in FIG. 4, has a first acute angle 64 and a second acute angle 66 which are designed to be complementary to and interact with the acute angle 42 of the coupler key groove and the acute angle 62 of the conduit 14. The term "complementary" as used herein may mean an angle that functions well with an angle of another part. It includes the situations where the parts are the same size, a mirror image of one another or an engaging part that is another size. In fact the acute angles 64 and 66 of the locking key may be equal to, slightly larger or smaller than the angles of the coupler key groove 36 and the conduit key groove 54. If an acute angle of a locking key is smaller than the acute angles of the groove into which it fits, the locking key will engage primarily at the apex of the acute angle when tensile forces are applied to the coupling assembly 10. This fit provides for a tight engagement of the parts. Alternately, the acute angles on the locking key may be slightly larger than the grooves. In that case, the key will have a wedging effect in the grooves and will also hold the parts securely. The acute angles 42 and 62 of the locking strip may be smaller or larger by about 10–15 degrees or more. In practice, the angles of the locking strip may be anything operable with the acute angles of coupling body groove 36 and the conduit key groove 54. In general, the acute angles of the grooves 36 and 54 may be 10–85 degrees, with a preferred range of 60–85 degrees. Theoretically they may be from 1 degree to 89 degrees. In one example, an angle of 67.5 degrees has been found to be operable for the acute angle of the locking key 16 when the groove is 80 degrees. It is only necessary, that the interlocking cooperation between the groove and locking key occur to prevent the separation of the coupler and the conduit under heavy loads.

The design of the coupling assembly of this invention causes the locking key to engage more tightly or dig into the acute angles in the coupler body key groove and the conduit key groove when the assembly is placed under tensile loads. As shown in FIG. 4, the sides of the locking key are angled so that they are forced deeply into the grooves when the conduit and the coupler are placed under tensile load. That is, the design of the interacting grooves and locking key tend to compress the sides of the locking key 16 on itself and into the grooves 36 and 54. For example, if the acute angles of the locking key were 67.5 degrees, a high tensile force may compress the angle's apexes and force them into the key grooves of the coupler body and conduit at the same time. Thus, even though HDPE or other soft materials may be utilized for any or all of the components, the coupler will remain engaged when placed under high tensile loads.

As noted in FIG. 1, the locking key 16 or flexible strip as it is sometimes called, has dimensions which allow it to be inserted into an aperture 68 which passes between the outer wall 24 and inner wall 26 of the coupler body 12. There is a similar aperture 69 for the second coupler key groove 44. The locking key 16 passes through the aperture 68 and into a pathway 70 (FIG. 4) which is formed by the coupler key groove 36 and the conduit key groove 54. In normal practice, the pathway 70 will pass circumferentially around the entire inner wall of the coupler body 12. However, any portion of the locking key may be inserted into a portion of the coupler body key groove so that it forms a lock, although it may only pass partially around the circumference. It is intended that any length of the locking key 16 that is sufficient to secure a coupling is included in this invention. As used in this application, the term "along" generally means around at least a portion of the circumference of a wall.

In use, the O-ring 18 is fitted around the conduit 14 which is then pushed into place in the coupler body 12. The flexible locking key. 16 is inserted through the aperture 68 where it passes into the pathway 70 until it encircles the casing 14.

Any extra length of locking key 16 may then be cut-off flush with the coupling body outer wall 24 or left exposed for removing the locking key at a later time. The same method would be used at the second end 22 of the coupler body 12 with the second conduit which is not shown.

The passageway 70 in the embodiment shown in FIG. 4, forms a parallelogram having two acute angles. Other complementary shapes of the groove may be utilized as long as at least one acute angle in the coupler body and locking key are utilized. It has been found that these acute angles greatly enhance the tensile forces that the coupling assembly may withstand. In one test, a pieces of HDPE conduit was coupled together with a standard coupler having the common conduit and coupler rectangular grooves. A locking key with a circular cross section was placed in the pathway formed by the coupler and, conduit grooves. The conduit and the coupler was then placed under a tensile load until they separated. The separation occurred at 2,700 pounds. A second test was conducted with the same size HDPE conduit (4 inch diameter) and a HDPE coupler. This time the coupler key groove and the conduit key groove had acute angles (80 degrees). A locking key of nylon with acute angles of 67.5 degrees, shaped as a parallelogram in cross-section, and having sides ⅛" by ½", was inserted into the pathway formed by the grooves. The conduit was again put under tensile load. At 8000 pounds the coupler broke, i.e. ruptured, but the locking key and grooves stayed locked.

As discussed above, the coupling assembly of this invention is particularly strong and has been shown to have unexpectedly good results with HDPE conduits. However, the coupling assembly of this invention is also applicable to conduits made of virtually any commercially available materials. These may include thermoplastics such as PVC, polycarbonates, PBT (polybutylene terethphthalate), polyamides (e.g. nylon), polyesters, polyolefins, and thermosets such as epoxy, polyesters and polyurethanes. The coupler body 12 and the locking key 16 may be also made from virtually any of the above noted materials and function well. However, to resist high tensile forces, it is desirable that the locking key is, made of one of the materials having a higher modulus of elasticity than the conduit or coupler so that it does not become deformed. That is, the locking key should maintain its general cross-sectional form and stay engaged in the coupler body and conduit grooves. The use of a polyamide, namely nylon, has been found to work successfully for the locking key and was used in the test described above. The coupler body may be made of HDPE or one of the harder materials mentioned for the conduits. The test reported earlier used a HDPE coupler body.

As already stated, prior art designs were not largely successful in coupling HDPE conduits. The use of acute angles in the grooves and the locking key of this coupler and coupling assembly provide significant advantages. They withstand orders of magnitude of axial forces greater than the prior art couplers and/or coupling assemblies.

There is another advantage of this invention. Since the grooves in the coupler and the conduit are cut with acute angles, the groove cuts are relatively shallow. Thus, the remaining material is thicker at the grooved portions and the coupler and conduit are stronger than the prior art which had deeper grooves.

It should be understood that the coupler body 12 may also be designed so that it fits inside the casing 14. In this case, the coupler key groove would be on the outside of the casing and the conduit key groove would be along its inner wall. The aperture 68 would then be located in the conduit 14.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A coupling assembly comprising;
   a coupler body having a generally cylindrical shape and an opening at one end, the coupler body having an inner wall with an inner circumference and an outer wall;
   a conduit having a generally cylindrical shape complementary to the coupler body, the conduit having an inner wall and an outer wall with an outer circumference and an opening at its end, the outer wall of the conduit having dimensions and shape so that it fits snugly inside the inner wall of the coupler body;
   an abutment extending from the coupler body or the conduit to limit the extent to which the conduit may be extended into the coupler body;
   a coupler key groove extending along the inner circumference of the inner wall of the coupler body, the coupler key groove being located axially away from the opening in the coupler body;
   an aperture connecting the coupler key groove with the outer wall of the coupler;
   a conduit key groove extending along the outer circumference of the outer wall of the conduit, the conduit key groove having a shape that is complementary to the coupler key groove, the conduit key groove being spaced from its end a distance which allows it to align with the coupler key groove when the end of the conduit abuts against the abutment along the inner wall of the coupler body;
   the coupler key groove and conduit key groove, when they are aligned forming a parallelogram passageway with acute angles; and
   a locking key which fits therein having a parallelogram cross section with acute angles that is complementary with of the coupler key groove and conduit key groove, each acute angle of the locking key being greater or less than the complementary acute angle of the coupler body key groove so that the acute angles of the locking key tend to engage tightly the coupler key groove and the conduit key groove if tensile forces are applied to separate the coupler, and the locking key has a length so that it may be inserted into the aperture and engage the coupler key groove and the conduit key groove.

2. The coupling assembly of claim 1, wherein the coupler and the conduit are made of a material selected from the group consisting of: polyolefins and PVC.

3. The coupling assembly of claim 2 wherein the conduit is made of high density polyethylene.

4. The coupling assembly of claim 2 wherein the conduit is made of a material selected from the group consisting of: polyolefins and PVC.

5. The coupling assembly of claim 1, wherein the locking key is made of a polyamide.

6. The coupling assembly of claim 1, wherein the acute angle of coupler key groove faces at least partially along the axis of the coupler toward the opening at its end and the acute angle of the locking key fits into the acute angle of the coupler.

7. The coupling assembly of claim 6, wherein the acute angle of the conduit key groove faces at least partially along the axis of the conduit in a direction generally opposite the acute angle in the coupler key groove whereby axial forces trying to separate the coupler and the conduit cause the compression of locking key into the acute angle of the conduit key groove.

8. The coupling assembly of claim 7, wherein the coupler has a sealing groove along the circumference of the inner wall of the coupler.

9. The coupling assembly of claim 7, wherein a sealing groove is spaced axially between the abutment and the coupler key groove and a sealing ring is located in the sealing groove.

10. The coupling assembly of claim 1, wherein the coupler has a second opening at its other end and a second coupler key groove with an acute angle.

11. The coupling assembly of claim 1 wherein at least one acute angle of the locking key is smaller than the acute angle of the passageway it engages.

12. A coupler, comprising:
a locking key having a parallelogram shaped cross section with acute angles;
a coupler body having a generally cylindrical shape and a first opening at one end, the coupler body having an inner wall with an inner circumference and an outer wall;
a coupler key groove extending along the inner circumference of the inner wall of the coupler body, a portion of the coupler key groove forming part of a complimentary parallelogram with a complimentary acute angle with the locking key, the coupler key groove being located axially away from the opening in the coupler body;
an aperture connecting the coupler key groove with the outer wall of the coupler in order that the locking key can be inserted therein;
wherein at least one acute angle of the locking key is greater or less than the complementary acute angle of the coupler body key groove so that the at least one acute angle of the locking key engages tightly with the complementary acute angle of the coupler key groove when the coupler assembly is engaged with a conduit key groove.

13. The coupler of claim 12, wherein there is an abutment extending from the inner wall of the coupler body to limit the extent to which a conduit may be extended into the coupler body.

14. The coupler of claim 13, wherein the coupler body has a second opening at a second end and a second coupler key groove spaced from the second opening, the second coupler key groove having a portion thereof being an acute angle.

15. The coupler of claim 14, wherein there is at least one sealing groove along the inner circumference of the inner wall of the coupler body.

16. The coupler of claim 14, wherein the second coupler key groove is shaped in part like a parallelogram.

17. The coupler of claim 14 wherein the coupler is made of high density polyethylene.

18. The coupler of claim 12 wherein at least one of the acute angles of the locking key is smaller than the acute angle of the passageway it engages.

19. A coupling assembly comprising;
a coupler body having a generally cylindrical shape and an opening at one end, the coupler body having an inner wall and an outer wall;
a conduit having a generally cylindrical shape complementary to the coupler body, the conduit having an inner wall and an outer wall with an opening at its end, the conduit having dimensions and shape so that it fits snugly with the coupler body;
a coupler key groove extending along the circumference of one of the walls of the coupler body, the coupler key groove being located axially away from the opening in the coupler body;
a conduit key groove extending along the circumference of one of the walls of the conduit, the conduit key groove having a shape that is complementary to the coupler key groove;
a locking key that is complementary with the coupler key groove;
the coupler key groove and conduit key groove when they are aligned, form a parallelogram with acute angles and the locking key has a cross section of a complementary parallelogram with acute angles which fits therein, each acute angle of the locking key being greater or less than the complementary acute angle of the coupler body key groove and the conduit key groove so that the acute angles of the locking key tend to engage tightly the coupler key groove and the conduit key groove if tensile forces are applied to separate the coupler and the conduit.

20. The coupling assembly of claim 19, wherein the coupler and the conduit are made of a material selected from the group consisting of: polyolefins and PVC.

21. The coupling assembly of claim 19, wherein there is an abutment extending from the coupler body or the conduit to limit the extent to which the coupler body may overlap with a conduit.

22. The coupling assembly of claim 19 wherein at least one of the acute angles of the locking key is smaller than the acute angle of the passageway it engages.

* * * * *